UNITED STATES PATENT OFFICE.

HENRY SPENCER BLACKMORE, OF MOUNT VERNON, NEW YORK.

PROCESS OF MAKING CARBID OR CARBID-CONTAINING ELECTRODES.

No. 917,707. Specification of Letters Patent. Patented April 6, 1909.

Original application filed April 11, 1906, Serial No. 311,162. Divided and this application filed April 23, 1907. Serial No. 369,756.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Making Carbid or Carbid-Containing Electrodes, of which the following is a specification, being a division from application Serial No. 311,162, filed April 11, 1906.

My invention relates to a new process of making electrodes for electrical, electrochemical, metallurgical, or other purposes, containing a metal carbid, and consists of an electro-conductive or metal carbid and a binder, such as carbon.

In prior art it has been the custom when electrodes of metal carbids have been desired, to employ the carbid in mass such as would be obtained by taking a piece of calcium carbid and forming or manufacturing the same in any desired shape by turning on a lathe or shaping by other mechanical means or casting the molten carbid in a mold. It is, however, disadvantageous to employ carbid electrodes of this character for the reason that it is expensive to thus manufacture the electrodes from ingots of carbid, or, in case the electrodes are cast from molten carbid, they are very apt to crack, split, or break, for the reason that they cannot be readily annealed. I prefer, however, to make the electrodes by crushing or pulverizing the carbid and mixing the same with a substance capable of yielding carbon by dissociation by the action of heat. These electrodes have the advantage when employed in electrochemical or metallurgical or smelting operations, of retaining their mass-continuity while being superficially acted upon by ingredients communicating therewith when employed as electrodes without crumbling or otherwise interiorly disintegrating.

In producing an electrode of calcium carbid by my process I prefer to take the pulverized calcium carbid and mix it with a hydrocarbon or substance containing the same, such as pulverized bituminous coal, in proportion of about eighty parts of calcium carbid to twenty parts of powdered bituminous coal. I find it is preferable to add to this mixture about five parts of anhydrous coal tar or pitch which has been deprived of the lighter hydrocarbons. This mixture is then heated and thoroughly incorporated and pressed in forms or molds or otherwise shaped in any convenient manner. They are then embedded in granulated carbon or frittered magnesium oxid and placed in retorts or other receptacles and heated in a non-oxidizing atmosphere to a bright red heat for from forty-eight to seventy-two hours which results in the fusion, in part, and dissociation of the hydrocarbon content, evolving hydrogen and light hydrocarbons and leaving the particles of carbid bound together by the carbon residue from the dissociated hydrocarbon. When the electrodes are properly baked they are allowed to cool and removed from the retort or containers in which they have been baked and the carbid is thus found to be bound together and superficially protected by the surrounding and communicating carbonaceous or carbonized binder. If the electrode has become very porous by reason of the gases evolved by too rapidly heating the same during the baking period, its porosity may be largely overcome by gradually heating the electrode, and in its heated condition, submerging it in liquefied anhydrous pitch and allowing it to cool therein, whereupon the liquid pitch is drawn into the pores of the electrode on cooling, and by removing and again gradually baking the electrode, thus saturated with pitch, at a low red heat for a few hours in a non-oxidizing atmosphere, an electrode of considerable tenacity and impervious consistency may be produced.

Other metal carbids and other carbon-yielding compounds may be employed to produce composite carbid electrodes of the character aforementioned without departing from the spirit of my invention, such as carbids of aluminium, barium, thorium, titanium, uranium, zirconium, etc., and other hydrocarbon carbon-yielding binders may be employed.

The term "electro-conductive", as employed herein with reference to the character of the carbid content of the electrode, relates to carbids of comparatively low electrical resistance in contradistinction from certain nonmetallic carbids, such as silicon carbid, which may be so highly resistant as to be practically considered non-conductors of electricity within reasonable bounds.

Having thus fully described my invention, what I claim and desire to secure by Letters Patent is,—

1. The process of making a composite carbid electrode, which consists in mixing an electro-conductive carbid with a solid hydrocarbon carbon-yielding compound and exposing the composition to the action of heat sufficient to dissociate the carbon-yielding substance.

2. The process of making a composite carbid electrode, which consists in mixing an electro-conductive carbid with a solid hydrocarbonaceous substance containing a carbon-yielding compound, subjecting the mixture to pressure sufficient to form or shape the same, and then exposing the composition, in a non-oxidizing atmosphere, to the action of heat sufficient to dissociate the carbon-yielding substance.

3. The process of making a composite carbid electrode, which consists in mixing a metal carbid with a solid hydrocarbon carbon-yielding compound and exposing the composition to the action of heat sufficient to dissociate the carbon-yielding substance.

4. The process of making a composite carbid electrode, which consists in mixing a metal carbid with a solid hydrocarbonaceous substance containing a carbon-yielding compound and exposing the composition to the action of heat sufficient to dissociate the carbon-yielding substance.

5. The process of making a composite carbid electrode, which consists in mixing a metal carbid with a solid hydrocarbonaceous substance containing a carbon-yielding compound, subjecting the mixture to pressure sufficient to form or shape the same, and then exposing the composition, in a non-oxidizing atmosphere, to the action of heat sufficient to dissociate the carbon-yielding substance.

6. The process of making a composite carbid electrode, which consists in mixing calcium carbid with a solid hydrocarbon carbon-yielding compound and exposing the composition to the action of heat sufficient to dissociate the carbon-yielding substance.

7. The process of making a composite carbid electrode, which consists in mixing calcium carbid with a solid hydrocarbonaceous substance containing a carbon-yielding compound and exposing the composition to the action of heat sufficient to dissociate the carbon-yielding substance.

8. The process of making a composite carbid electrode, which consists in mixing calcium carbid with bituminous coal and exposing the composition to the action of heat sufficient to dissociate the carbon-yielding substance.

9. The process of making a composite carbid electrode, which consists in intimately associating calcium carbid with bituminous coal and anhydrous coal tar, and exposing the mixture to the action of heat sufficient to dissociate the carbon-yielding substance.

10. The process of making a composite carbid electrode, which consists in mixing calcium carbid with a substance containing a solid hydrocarbon carbon-yielding compound, subjecting the mixture to pressure sufficient to form or shape the same, and then exposing the composition, in a non-oxidizing atmosphere, to the action of heat sufficient to dissociate the carbon-yielding substance.

11. The process of making a composite carbid electrode, which consists in mixing a carbid with a solid hydrocarbonaceous binder and exposing the composition to the action of heat.

12. The process of making a composite carbid electrode, which consists in mixing a metal carbid with a solid hydrocarbonaceous binder and exposing the composition to the action of heat.

13. The process of making a composite carbid electrode, which consists in mixing calcium carbid with a solid hydrocarbonaceous binder and exposing the composition to the action of heat.

14. The process of making a composite carbid electrode, which consists in mixing a carbid with a solid hydrocarbon carbon-yielding substance and exposing the composition to the action of heat.

15. The process of making a composite carbid electrode, which consists in mixing a metal carbid with a solid hydrocarbon carbon-yielding substance and exposing the composition to the action of heat.

16. The process of making a composite carbid electrode, which consists in mixing calcium carbid with a solid hydrocarbon carbon yielding substance and exposing the composition to the action of heat.

17. The process of making a composite carbid electrode, which consists in mixing a carbid with a solid hydrocarbon carbonaceous substance and exposing the composition to the action of heat.

18. The process of making a composite carbid electrode, which consists in mixing a metal carbid with a solid hydrocarbon carbonaceous substance, and exposing the composition to the action of heat.

19. The process of making a composite carbid electrode, which consists in mixing calcium carbid with a solid hydrocarbon carbonaceous substance and exposing the composition to the action of heat.

20. The process of making a composite carbid electrode, which consists in mixing a carbid with a solid hydrocarbon and exposing the composition to the action of heat.

21. The process of making a composite carbid electrode, which consists in mixing a metal carbid with a solid hydrocarbon and exposing the composition to the action of heat.

22. The process of making a composite carbid electrode, which consists in mixing calcium carbid with a solid hydrocarbon, and exposing the composition to the action of heat.

23. The process of making a composite carbid electrode, which consists in mixing a carbid with bituminous coal and exposing composition to the action of heat.

24. The process of making a composite carbid electrode, which consists in mixing a metal carbid with bituminous coal and exposing the composition to the action of heat.

25. The process of making a composite carbid electrode, which consists in mixing calcium carbid with bituminous coal and exposing the composition to the action of heat.

26. The process of making a composite carbid electrode, which consists in mixing a carbid with bituminous coal and anhydrous coal tar, and exposing the composition to the action of heat.

27. The process of making a composite carbid electrode, which consists in mixing a metal carbid with bituminous coal and anhydrous coal tar and subjecting the composition to the action of heat.

28. The process of making a composite carbid electrode, which consists in mixing calcium carbid with bituminous coal and coal tar, and exposing the composition to the action of heat.

29. The process of making a composite carbid electrode, which consists in mixing a carbid with a solid hydrocarbon binder, exposing the composition to the action of heat, saturating the heated electrode with fluid hydrocarbon, and again subjecting it to the action of heat.

30. The process of making composite carbid electrode, which consists in mixing a metal carbid with a solid hydrocarbon binder, exposing the composition to the action of heat, saturating the heated electrode with fluid hydrocarbon and again subjecting it to the action of heat.

31. The process of making a composite carbid electrode, which consists in mixing calcium carbid with a solid hydrocarbon binder, exposing the composition to the action of heat, saturating the heated electrode with fluid hydrocarbon, and again subjecting it to the action of heat.

In testimony whereof I affix my signature in presence of two witnesses.

HENRY SPENCER BLACKMORE.

Witnesses:
E. M. HOLMES,
J. R. NOTTINGHA-